(12) United States Patent  (10) Patent No.: US 6,574,120 B1
Chou  (45) Date of Patent: Jun. 3, 2003

(54) PORTABLE RELAY BASE

(76) Inventor: Jonie Chou, 9F-4, No. 232, Chung Ho Road, Chung Ho City, Taipei Hsien (TW)

( * ) Notice: Subject to any disclaimer, the term of this patent is extended or adjusted under 35 U.S.C. 154(b) by 0 days.

(21) Appl. No.: 10/058,502

(22) Filed: Jan. 30, 2002

(30) Foreign Application Priority Data

Dec. 4, 2001 (TW) ...................................... 90221068 U

(51) Int. Cl.[7] ................................................. H05K 7/00
(52) U.S. Cl. ........................ 361/819; 361/787; 361/776; 200/52 R
(58) Field of Search ................................. 361/819, 826, 361/787, 776; 200/52 R

(56) References Cited

U.S. PATENT DOCUMENTS 3,812,307 A * 5/1974 Wagner et al. ............ 200/52 R
4,232,837 A * 11/1980 Cutler et al. ................ 242/372
4,520,239 A * 5/1985 Schwartz ................... 191/12.4
5,629,826 A * 5/1997 Roca et al. ................. 361/118

* cited by examiner

Primary Examiner—David Martin
Assistant Examiner—Hung Bui
(74) Attorney, Agent, or Firm—Troxell Law Office PLLC

(57) ABSTRACT

A portable relay base is composed of an upper cover and a lower cover being oppositely joined to each other. The portable relay base at a lateral side thereof at least provides an outlet unit composed of two contact poles and/or one ground pole and at a proper position thereof provides an opening. The portable relay further comprises a power line carrier, a power line, and a circuit board. The power line carrier has a shape of disk and fits with the lower cover axially. An automatic positioning/wire collecting apparatus is provided in the power line carrier and a central hollow reel is provided at a top thereof with at least two concentric spacing rings in accordance with the number of poles of the power. The power line is a lead wire coiling around the reel as a bundle with an end thereof extending an electricity taking plug outside the opening and another end thereof having at least two conductive pieces. Both of the ends are fixedly attached to the spacing rings. The circuit board is fixed to the inner part of the upper cover with a resilient contact piece corresponding to and touching each of the conductive pieces. Once the power line carrier rotates, the power through the electricity taking plug can be delivered to each of the outlet units via at least two connecting wires.

9 Claims, 4 Drawing Sheets

PORTABLE RELAY BASE

BACKGROUND OF THE INVENTION

1. Field of the Invention

The present invention relates to a portable relay base, and particularly to a portable relay base, which offers a function of automatic positioning/wire collecting. Furthermore, a communication line with a function of automatic positioning/wire collecting is added so that the present invention is a portable relay base performing not only power supply but also signal extension.

2. Description of Related Art

Generally, a common puzzle for tourists and business persons who need to be out of town often is each receptacle in a temporary staying hotel room or resident house is stationary at an unexpected location such that the electric appliances such as a portable computer, a mobile phone, a personal digital assistant (PDA) and an electric razor carried about with them can only be operated uncomfortably under a circumstance of complying to the preset receptacle. Some persons have prepared an extension receptacle while using their electric appliances to overcome the deficiency of the fixed located receptacle. However, the extension available in the market does not offer a function of rewinding the lead wire thereof so that it is very possible for the lead wire thereof becomes tangled not only to occupy a considerable space but also to result in being taken in inconveniently. Thus, it is hard for the extension receptacle being carried about with the user.

Besides, due to the vigorous development of information industry, links between people are getting closer and the communication apparatus plays a very important role. The so called communication apparatus typically refers to the telephone and the facsimile, wherein, the telephone usually is utilized to discuss business matter for businessmen or to extend one's greetings to others without face to face, and the facsimile can be used for sending or receiving letters or pictures. A rapid development of INTERNET makes a personal computer with a modem and a portable computer with related software can send and receive letters or pictures via e-mail. Meanwhile, as soon as the computer is logged on the INTERNET, it is possible to browse and download the data needed. Hence, the computer is belonged to one of communication device from a broad sense.

However, it is very inconvenient for the businesspersons who are frequently out of town for business or tourists while the communication apparatus such as the portable computer or the facsimile machine is used and it is necessary to comply with the fixed located receptacles or to prepare signal extension line.

SUMMARY OF THE INVENTION

A portable relay base according to the present invention is composed of an upper cover and a lower cover being oppositely joined to each other. The portable relay base at a lateral side thereof at least provides an outlet unit composed of two contact poles and/or one ground pole and at a proper position thereof provides an opening. The portable relay further comprises a power line carrier, a power line, and a circuit board. The power line carrier has a shape of disk and fits with the lower cover axially. An automatic positioning/wire collecting apparatus is provided in the power line carrier and a central hollow reel is provided at a top thereof with at least two concentric spacing rings in accordance with the number of poles of the power. The power line is a lead wire, which is coiled up around the reel as a bundle with an electricity taking plug at an end thereof being disposed outside the opening and another end thereof having at least two conductive pieces. Both of the ends are fixedly attached to the spacing rings. The circuit board is fixed to the inner part of the upper cover with a resilient contact piece corresponding to and touching each of the conductive pieces. Once the power line carrier rotates, the power through the electricity taking plug can be delivered to each of the outlet units via at least two connecting wires.

BRIEF DESCRIPTION OF THE DRAWINGS

The present invention can be more fully understood by referencing to the following detailed description and accompanying drawings, in which.

DETAILED DESCRIPTION OF THE PREFERRED EMBODIMENTS

Figure 1:
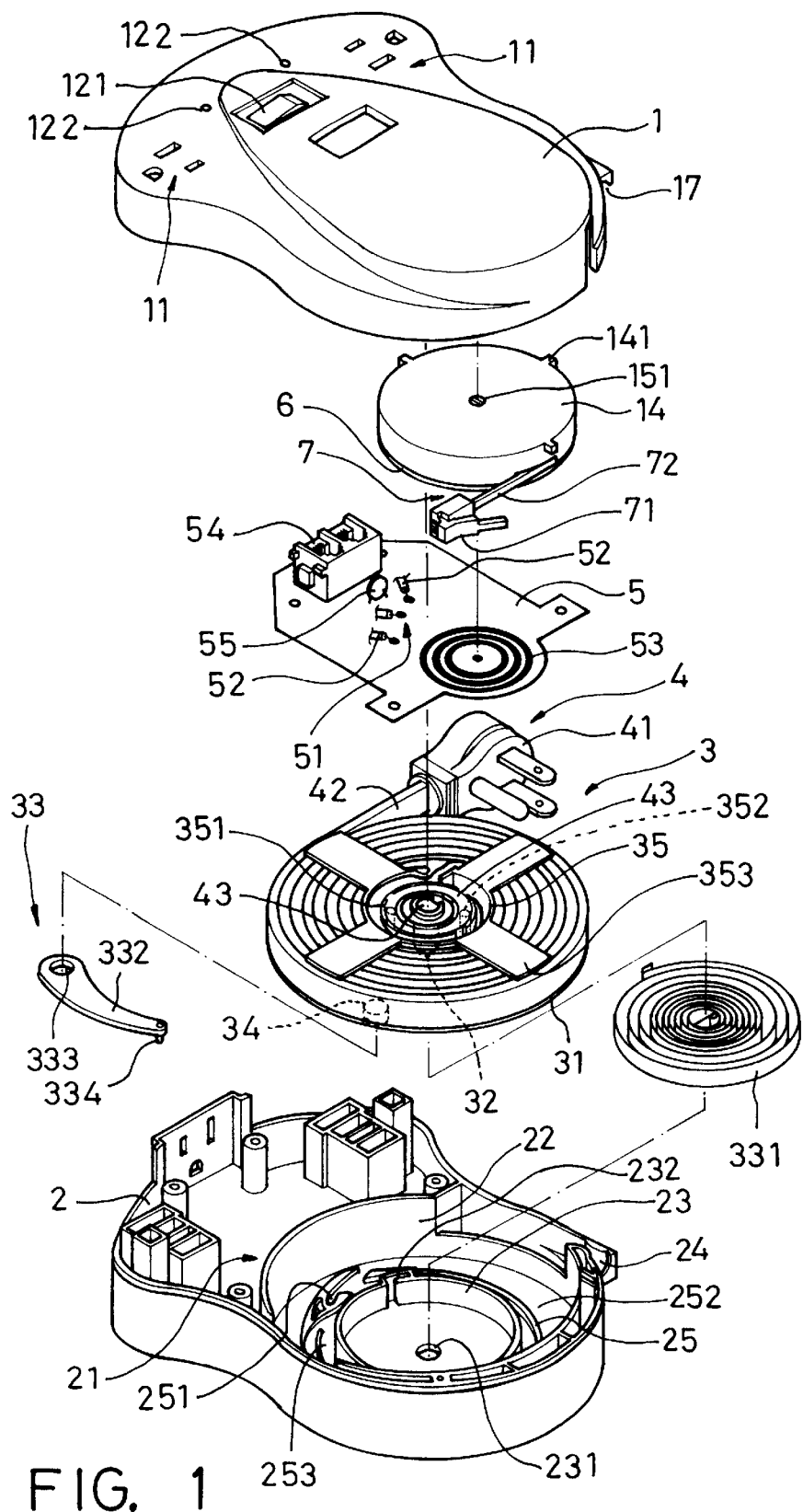
FIG. 1 is an exploded perspective view of a portable relay base according to the present invention.
Figure 2:
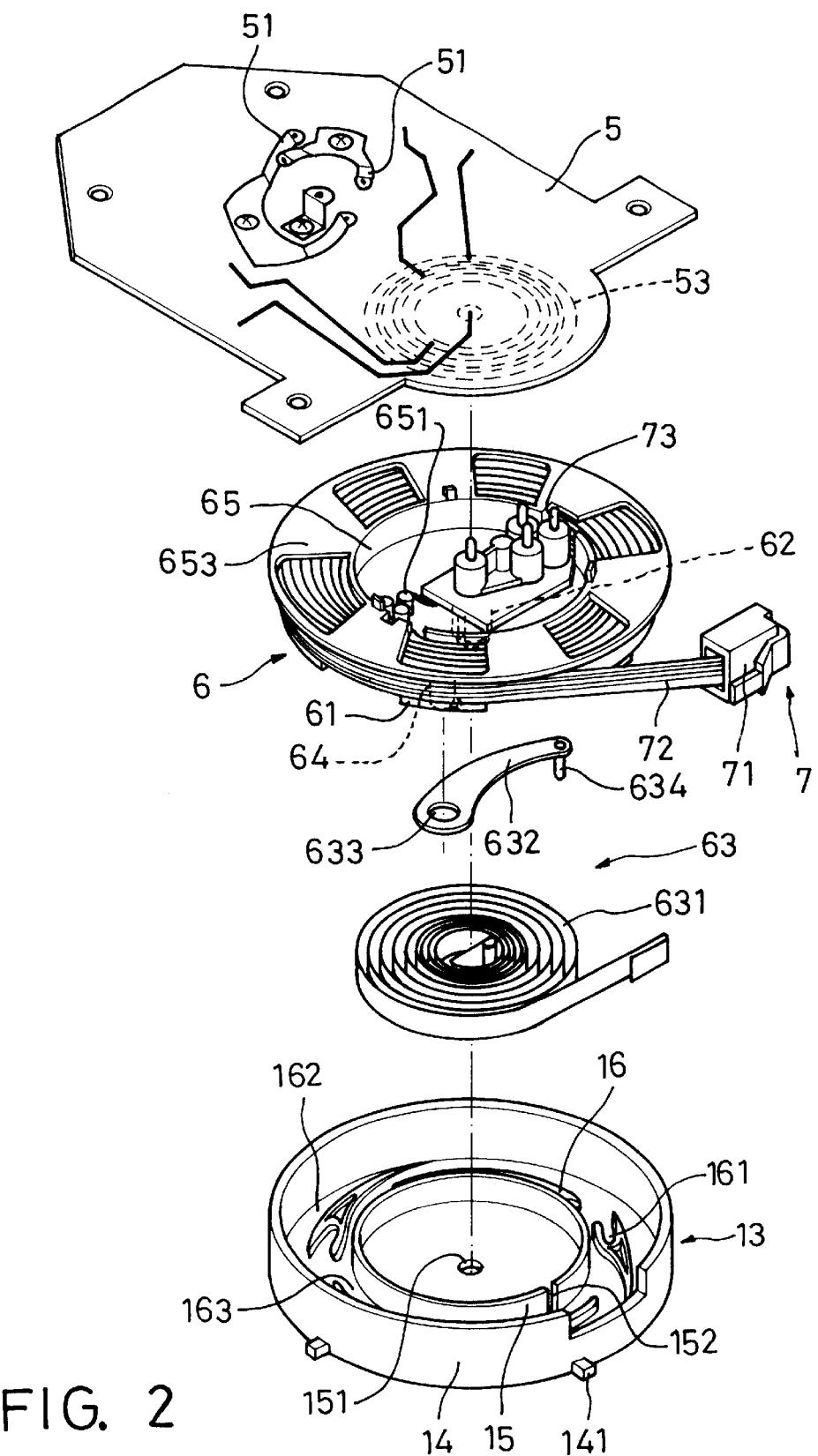
FIG. 2 is an inversed exploded perspective view illustrating a circuit board, a signal line and automatic positioning/wire collecting apparatus shown in FIG. 1.
Figure 3:
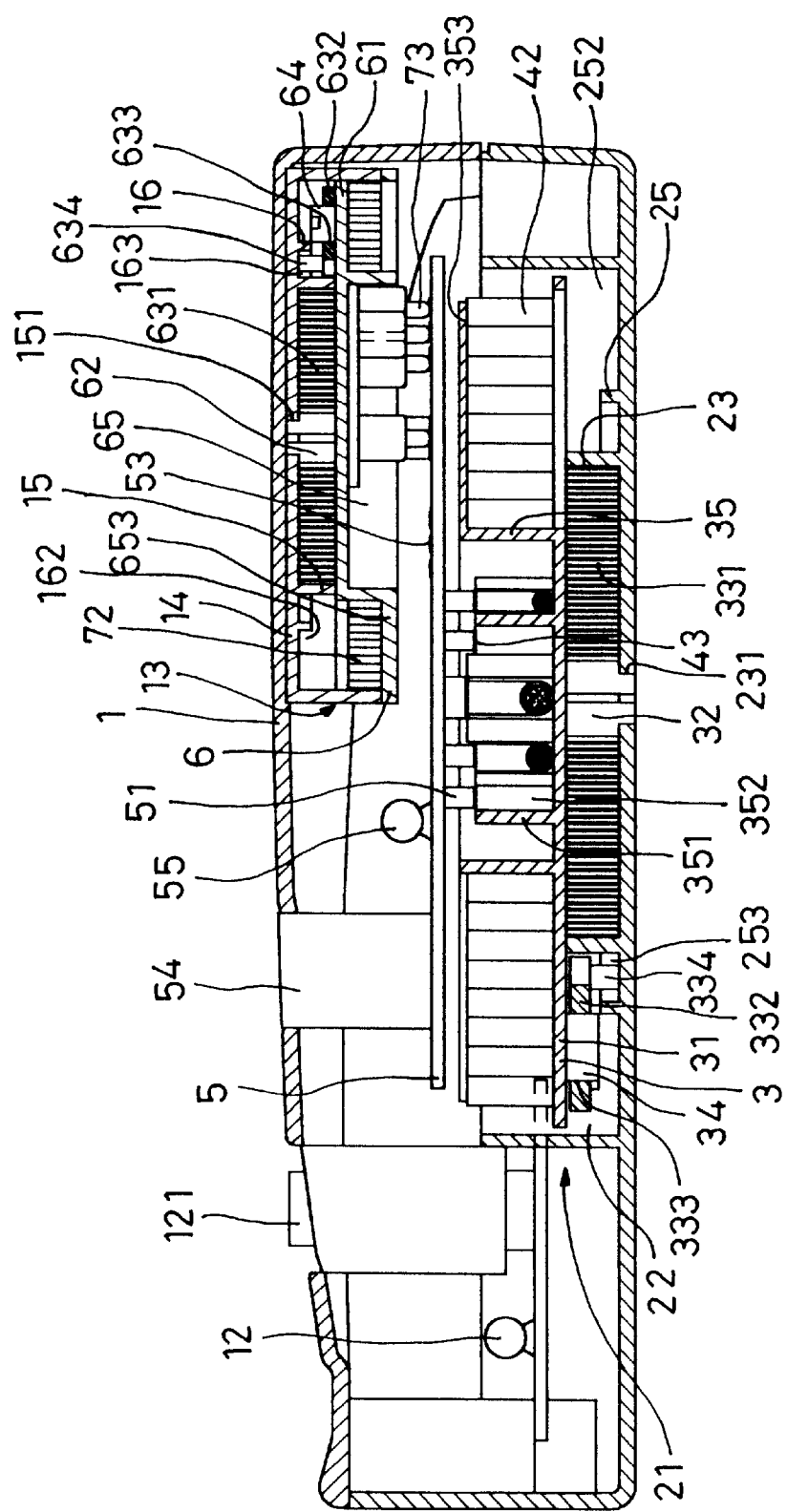
FIG. 3 sectional view illustrating the circuit board with a power line and a communication line.
Figure 4:
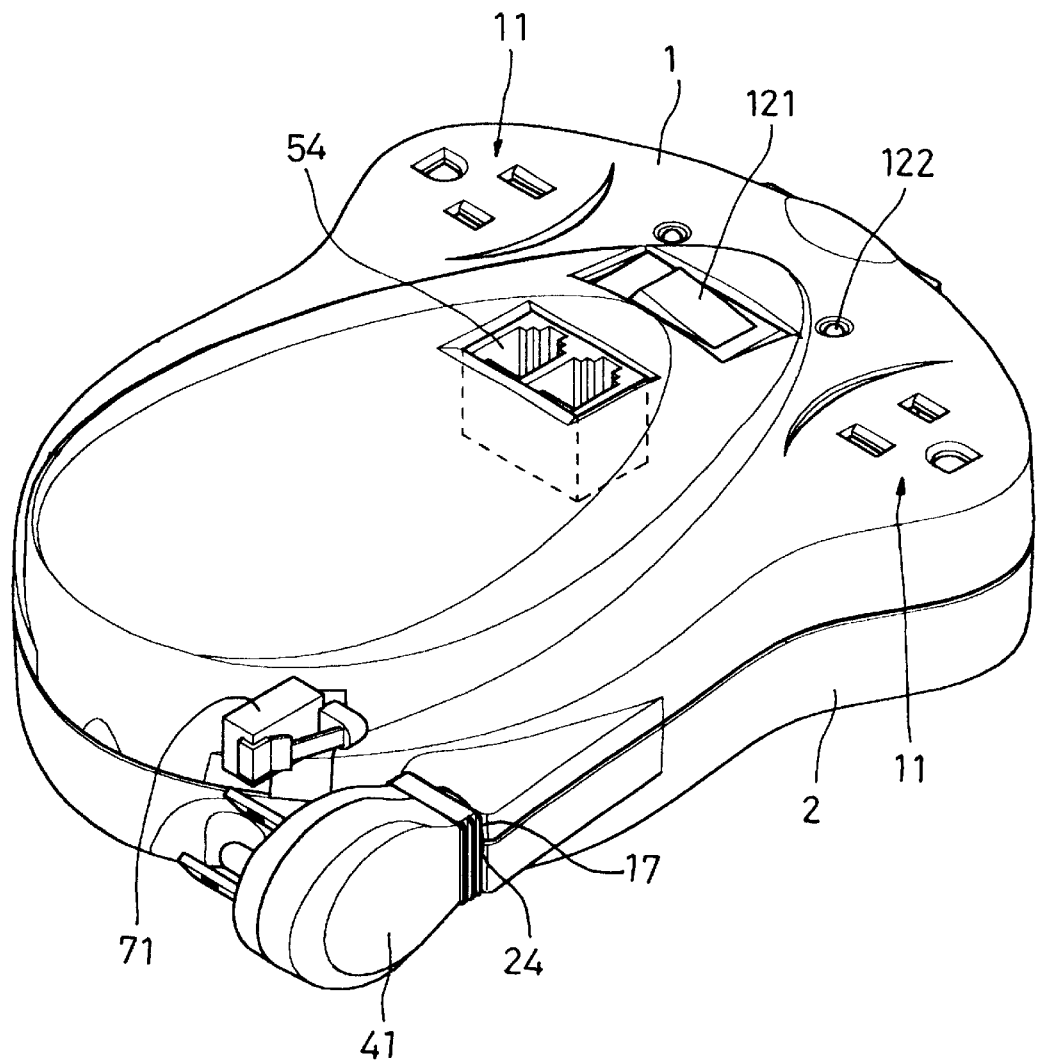
FIG. 4 is a perspective view of the portable relay base of the present invention after assembling.

Referring to FIGS. 1 to 4, a portable relay base according to the present invention comprises an upper cover 1, a lower cover 2, a power line carrier 3, a power line 4 and a circuit board 5.

Wherein, the upper cover 1 is a casing with an hollow bottom and provided with at least an outlet unit 11 composed of two connect poles and/or a ground pole at a lateral side thereof. The upper cover 1 at the inner side thereof is fixedly attached with the circuit board 5 by way of conventional fasteners such as screws.

The lower cover 2 is a casing provided with a configuration and a size corresponding to the upper cover so as to be joined to the upper cover 1. The lower cover at a lateral side thereof is provided with a locating part 21, which is composed of a casing ring 22 and a spring ring 23 disposed concentrically, receives a power line carrier 3 and a coil spring 331 respectively. The casing ring 22 has a circumferential opening part 24 extending tangentially such that a lead wire 42 of the power line 4 can be movably contained in the opening part 24. The spring ring 23 at the center thereof has an axial hole 231 for fitting with an axle of the power line carrier 3 and at the circumferential side thereof has a catch groove 232 for locating the outer end of the coil spring 331. Besides, at least two opposite arched guide rails 25 and at least two Y-shaped locating recesses 251 are provided between the casing ring 25 and the spring ring 23 such that an outer track 252 and an inner track 253 can be spaced apart by the guide rails 25. The locating part 21 and an extensible guide part 33 at the bottom of the power line carrier 3 can form an automatic positioning/wire colleting apparatus. The actuation of the automatic positioning/wire collecting apparatus is described hereinafter.

The power line carrier 3 is a disk shaped frame and provides a carrier face 31 for the power line 4 being coiled up thereon. The power line carrier 3 at the lower center thereof extends downward a carrier shaft 32 for fitting with the axial hole 231 and connecting with the coil spring 331, which is attached to an extensible guide part 33, such that both ends of the coil spring 331 is joined to the power line carrier 3 and the lower cover 2 respectively. Besides, the carrier face 31 at the bottom thereof has a downward carrier post 34 disposed near the rim thereof to rotationally fit with an arm hole 333 at an end of an arched sway arm 332 and the arched sway arm 332 at another end thereof has a guide post 334 extending downward to be inserted into one of the locating recesses 251. The distinguishing feature of the present invention is in that the carrier face 31 at the center area thereof projects a hollow reel 35 with at least two inner spacing rings 351 based on the number of poles of the power line 4. Each of the spacing rings 351 has a notch for being passed through by the lead wire 42 and provides a plurality of holding pieces 352. Each conductive piece 43 connects with a neutral line, a fire line and/or a ground line of the lead wire to form a close circuit. Besides, in order to ensure the neatness during pulling the power line 4 out or taking the power line 4 in, the reel 35 at the top edge thereof at least extends three wing plates 353 horizontally so as to keep the wire in a state of being in order.

Next, the principle of operation with regard to the automatic positioning/wire collecting apparatus will be explained in detail. When a plug 41 of the power line 4 is held and pulled outward by the user to stretch the lead wire 42 outward, the power line carrier 3 can turn about the axial hole 231 synchronously with the coil spring 331 in the spring ring 23 gradually so as to tight up the coil spring 331 and the rotational sway arm 332 may swing about the carrier post 34 to urge the guide post 334 detaching one of the locating recesses 251 and turning along the outer track 252. In case of the guide post 334 reaches to an elevation difference from one of the locating recesses 251, the guide post 334 may enter the inner track 253 and remain in a state of rotating. When the user stops pulling the power line 4 and loosens his grip, the coil spring 331 may expand due to the resilience itself and the guide post may displace along the guide rails 25 from the inner track 253 due to the action of centrifugal force to enter one of the locating recesses 251 such that it constitutes an effect of positioning and the plug 41 can be inserted into an outlet to allow the conductive pieces 43 in a state of being electrified.

In case of performing the operation of taking in the power line, the lead wire 42 is pulled out a small segment first to separate the guide post 334 from one of the locating recesses 251 and enters the inner track 253 from the outer track 252 again. Then, the user loosens his grip and the coil spring 331 can urge the power line carrier 3 to turn inversely by way of the expansion resilience thereof to result in the guide post 334 turning inversely in the inner track 253 till the plug 41 touching the opening part 24 such that the guide post 334 can move along the guide rails 25 to engage with one of the locating recesses 251 for completing the automatic taking in operation.

The lead wire 42 of the power line 4 at an end thereof provides the plug 41 and at another end thereof connects with at least two conductive pieces 43 concentrically and both ends of the lead wire 42 rest and fixed in a respective corresponding spacing ring 351. Further, the lead wire 42 is coiled up around the reel 35 to form a coil bundle.

The circuit board 5 is fixedly attached to and disposed in the upper cover 1 and a plurality of metal contacts 51 extend from the circuit board 5 corresponding to the conductive pieces 43 respectively so as to contact with the conductive pieces 43 individually such that connective lines 52 can connect with each outlet unit 11 respectively to form a close circuit for offering a function of power supply. It is noted that the contacts 51 preferably has a shape of Y to assure the stability of contact while in use.

In order to offer a protection function for the relay base of the present invention, a surge absorber 12 (conventional and not shown in detail) is fixed in the upper cover 1 between the outlet units 11 and at least two connective lines 52 to control on/off of the power via a control switch 121 on the upper cover 1 and to perform a reset in case of overload. Besides, in order to be aware of the status of the present invention definitely, two indicator lights 122 are arranged on the upper cover 1 to show the surge protection and ground indication.

Furthermore, in order to offer a function of communication for the relay base of the present invention, a signal line carrier 6 and a communication line 7 are provided therein. Hence, the circuit board 5 provides a plurality of concentric guide rings 53 according to the number of pins on the communication line 7 so as to send the signal to at least an exposed signal output outlet 54 on the upper cover 1. In addition, in order to secure the communication device such as a portable computer, another surge absorber 55 may be mounted between the guide rings 53 and the signal output outlet 53 to prevent the electric appliance from damage resulting from an excess instantaneous current.

The signal line carrier 6 is disposed in a locating device 13 at the inner top wall of the upper cover 1 and can project from the inner top wall directly or is made as a unit cell. The signal line carrier 6 is identical with the preceding locating device 21, that is, the signal line carrier 6 comprises a casing ring 14 and a spring ring 15 and at least two opposite arched guide rails 16 with two Y shaped locating recesses 161. In addition, the guide rails 16 is formed an inner track 163 and an outer track 162. In case of the signal line carrier 6 being made as a unit cell, the casing ring 14 at the inner top thereof juts out a plurality of engaging projections 141 so as to join engaging holes preset at the inner top wall.

The signal line carrier 6 is about the same as the power line carrier 3, that is, a frame face 61 at the bottom thereof has an axial shaft 62 for fitting with an axial hole 151 and a projection 64 is provided next to the rim thereof for being joined to an extensible guide part 63. Hence, a coil spring at an end thereof fixed to the axial shaft 62 and at another end thereof is inserted into an engaging recess 152 of the spring ring 15 so that the coil spring 631 can be received between the frame face 61 and the spring ring 15. A sway arm 632 at an end thereof has an arm hole 633 fitting with frame projection 64 and at another end thereof has a guide post 634 engages with one of locating recesses 161. The frame face 61 at the center thereof has a hollow reel 65 for the communication line 7 being coiled up around as a bundle and at the upper rim thereof is surrounded by a plurality of wing plates 653 to form an annular part. The reel 65 at the inner side thereof connects with a plurality of elastic terminals 73 and this arrangement is different from the preceding one and the signal wire 72 passes through a plurality of spacing projections in a surrounding way for preventing the signal wire 72 from rupture due to an over haul.

The signal wire 72 of the signal line 7 is coiled up around the reel 65 so as to form a bundle such that an end thereof is received in the opening part 17 of a signal plug 71 and another end thereof has a plurality of pin signal to connect with the resilient terminals 73 fixed to the hollow reel 65 for touching each guide ring 53. In this way, the signal can pass through the surge absorber 55 to be sent to at least a signal output outlet 54 for being inserted with a communication device.

It is appreciated from the preceding embodiment description of the present invention that the power line of the relay base provides a function of automatic positioning/wire collecting and makes the portability being realized effectively. Besides, a communication line has been added to the present invention with a function of automatic positioning/wire collecting as well. The electricity taking plug and the signal plug can be pulled out separately and inserted into a stationary power receptacle and a signal outlet to integrate the power supply and the communication signal in the relay base such that a user can use an electric appliance such as a portable computer to login on the INTERNET or send or receive e-mails with extreme facility. A surge absorber is provided on the power line and the signal line respectively to assure the safety of the electric while in use. Furthermore, the circuit board of the present invention offers a function of transfer between the power and the signal so that it is not possible for the power line carrier and the signal line carrier to occur an imperfect contact during rotation.

While the invention has been described with reference to a preferred embodiment thereof, it is to be understood that modifications or variations may be easily made without departing from the spirit of this invention, which is defined by the appended claims.

What is claimed is:

1. A portable relay base, which is composed of an upper cover and at lower cover joined to each other including, at a lateral side thereof, an outlet unit composed of two contact poles and one ground pole and an opening;

the portable relay base further comprising:

a power line carrier, being a disk shape and fitting with the lower cover axially, including an automatic positioning/wire collecting apparatus, and a central hollow reel at a top thereof with at least two concentric spacing rings;

a power line including a lead wire coiled around the central hollow reel with a first end thereof with an electricity plug extending outside the opening and a second end thereof having at least two conductive pieces; and a circuit board fixed to an inner part of the upper cover, including resilient contact pieces touching each of the conductive pieces, wherein the circuit board at an upper face thereof includes at least two concentric guide rings, each of the guide rings is connected to at least a signal output outlet exposed on the upper cover via electrical lines and a second opening is provided on the upper cover; the relay base further comprises a communication line, being a signal wire coiling around the reel with an end with a signal plug extending outside the second opening and another end thereof having resilient terminals corresponding to each of the guide rings, the resilient terminals being fixed to the hollow reel so as to touch the guide rings respectively;

whereby, when the power line carrier rotates, power through the electricity taking plug is delivered to each of the outlet units via the at least two connecting wires, and, when the signal line carrier rotates, a signal from the signal plug is delivered to each of the signal outlets via the communication line.

2. The portable relay base according to claim 1, further comprising a surge absorber, which is fixed to the inner part of the upper cover and connected between the connecting wires and the outlet unit.

3. The portable relay base according to claim 2, wherein the surge absorber has a control switch and an indication light exposed on the upper cover for controlling on/off of power, resetting overload and indicating a status of protection.

4. The portable relay base according to claim 1, wherein each of the contact pieces has a Y shaped contact end.

5. The portable relay base according to claim 1, further comprising a plurality of support pieces in the spacing rings.

6. The portable relay base according to claim 1, further comprising a surge absorber fixedly attached between the circuit board and the signal output outlet.

7. The portable relay base according to claim 1, wherein the hollow reel of the power line carrier includes a plurality of laterally extending wing pieces at an upper rim thereof for regulating the lead wire of the power line or the signal wire on the communication line.

8. The portable relay base according to claim 1, wherein the automatic positioning/wire collecting apparatus between the power line carrier and the upper cover or lower cover further comprises:

a locating device, being arranged in a cover piece, which is composed of concentric casing ring and a spring ring to receive a lead wire holder and a coil spring respectively, at least two arched guide rails being oppositely disposed between said two rings, and at least two fork shaped locating recesses being in between and an outer track and an inner track are spaced apart by the guide rails;

an extensible guide part, being the power line carrier at the lower center thereof extending downward a carrier shaft to fit with an axial hole of the spring ring and both ends of the coil spring being jointed to the power line carrier and the spring ring respectively, and the power line carrier at the bottom thereof having a downward carrier post disposed near the rim thereof to rotationally fit with an arm hole at an end of an arched sway arm and the arched sway arm at another end thereof having a guide post extending downward to insert into one of the locating recesses;

whereby, once the lead wire is pulled outward or retreats inward to rotate the power line carrier and to urge the guide post detaching one of the locating recesses and turning along the outer track, the guide post may enter the inner track and remain in a state of rotating; as soon as the power line is loosened from being gripped, the coil spring may expand and the guide post may displace along the guide rails due to the action of centrifugal force to enter one of the locating recesses so as to form a state of automatic positioning or collecting the wire.

9. The portable relay base according to claim 8, wherein the locating device is made as a cell, and the casing piece at a rim thereof has a plurality of extending engaging projections and at the inner top wall thereof has a plurality of engaging recesses corresponding to the engaging projections for fitting with each other such that the cell can be fixed in the casing piece.

* * * * *